United States Patent
Rowland

(10) Patent No.: US 10,459,868 B1
(45) Date of Patent: Oct. 29, 2019

(54) MODULAR CHIP EXPANSION BRIDGE AND CORRESPONDING METHODS

(71) Applicant: Marvell International Ltd., Hamilton (BM)

(72) Inventor: Stephen Rowland, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 44 days.

(21) Appl. No.: 15/710,274

(22) Filed: Sep. 20, 2017

Related U.S. Application Data

(60) Provisional application No. 62/396,951, filed on Sep. 20, 2016.

(51) Int. Cl.
*G06F 13/42* (2006.01)
*G06F 13/20* (2006.01)
*G06F 13/38* (2006.01)

(52) U.S. Cl.
CPC ......... *G06F 13/4221* (2013.01); *G06F 13/20* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 2010/0057990 A1* | 3/2010 | Mizuno | ................... | G06F 3/061 711/114 |
| 2010/0189418 A1* | 7/2010 | Mizutani | .......... | G11B 20/10527 386/241 |
| 2011/0191536 A1* | 8/2011 | Mizuno | ................. | G06F 3/0611 711/114 |
| 2015/0169495 A1 | 6/2015 | Zheng | | |
| 2015/0338909 A1* | 11/2015 | Woodruff | .............. | G06F 1/3209 713/323 |
| 2016/0285968 A1* | 9/2016 | Mishra | ................ | H04L 61/2007 |

* cited by examiner

*Primary Examiner* — Henry Tsai
*Assistant Examiner* — Aurangzeb Hassan

(57) ABSTRACT

An expansion bridge chip for a modular chip system includes at least one upstream interface for communicating with an application processor module, a plurality of downstream interfaces for communicating with peripheral modules, and an upstream address decoder on each interface for directing data on the upstream interface to a downstream interface. In such an expansion bridge chip, each upstream interface may have a first bandwidth, each downstream interface may have a respective bandwidth, and the expansion bridge chip may be balanced, such that a sum of all respective bandwidths of the plurality of downstream interfaces is equal to the first bandwidth. Alternatively, each upstream interface may have a first bandwidth, each of the downstream interfaces may have a respective bandwidth, and the expansion bridge chip is unbalanced, such that a sum of all respective bandwidths of the plurality of downstream interfaces exceeds the first bandwidth, and interfaces contend for bandwidth.

24 Claims, 4 Drawing Sheets

US 10,459,868 B1

MODULAR CHIP EXPANSION BRIDGE AND CORRESPONDING METHODS

CROSS REFERENCE TO RELATED APPLICATION

This claims the benefit of commonly-assigned U.S. Provisional Patent Application No. 62/396,951, filed Sep. 20, 2016, which is hereby incorporated by reference herein in its entirety.

FIELD OF USE

Implementations of the subject matter of this disclosure generally pertain to a modular chip architecture and methods for configuring systems-on-multiple-modular-chips. In particular, implementations of the subject matter of this disclosure pertain to an expansion bridge chip for such an architecture, and to methods for incorporating an expansion bridge chip into systems-on-multiple-modular-chips.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

A protocol, referred to as either the hopping bus protocol or the MoChi protocol, has been developed for optimizing the efficiency of intra-chip and inter-chip communications of Systems-on-Chip ("SoCs"). Background of how the hopping bus protocol enables intra-chip and inter-chip communications between discrete SoCs and their components is described in commonly-assigned U.S. Patent Publication 2015/0169495), the contents of which are hereby incorporated by reference herein in their entirety.

Under the hopping bus protocol an individual chip or SoC may be an application processor (e.g., a CPU) or a peripheral and may include processing circuitry that assigns and decodes addresses or identifiers for each chip or SoC. The chips or SoCs can thereby communicate, so that each chip or SoC serves as a module of a larger system-on-multiple-modular-chips. Within such a system, each modular chip is provided with a certain number of upstream interfaces, and a certain number of downstream interfaces, which may limit how the modules can be interconnected to form a system-on-modular-multiple-chips.

SUMMARY

In accordance with implementations of the subject matter of the present disclosure, an expansion bridge chip for a modular chip system includes at least one upstream interface for communicating with an application processor module, a plurality of downstream interfaces for communicating with peripheral modules, and an upstream address decoder on each interface of the least one upstream interface for directing data on the upstream interface to an interface of the plurality of downstream interfaces.

Such an expansion bridge chip may further include memory for buffering signals between the at least one upstream interface and the plurality of downstream interfaces.

In such an expansion bridge chip, signals from a peripheral module may propagate exclusively to an application processor module from an interface of the plurality of downstream interfaces to a particular one of the at least one upstream interface. Alternatively, in such an expansion bridge chip, signals from at least one interface of the plurality of downstream interfaces may propagate to one of (a) the at least one upstream interface, and (b) another interface of the plurality of downstream interfaces, and such an expansion bridge chip may further include a respective downstream address decoder on the at least one downstream interface for directing signals from the at least one downstream interface to one of (a) the at least one upstream interface, and (b) the another interface of the plurality of downstream interfaces.

In such an expansion bridge chip, each interface of the at least one upstream interface may have a first bandwidth, each respective interface of the plurality of downstream interfaces may have a respective bandwidth, and the expansion bridge chip may be balanced, such that a sum of all respective bandwidths of the plurality of downstream interfaces is equal to the first bandwidth. Alternatively, in such an expansion bridge chip, each interface of the at least one upstream interface may have a first bandwidth, each respective interface of the plurality of downstream interfaces may have a respective bandwidth, and the expansion bridge chip is unbalanced, such that a sum of all respective bandwidths of the plurality of downstream interfaces exceeds the first bandwidth.

A system-on-multiple-modular-chips includes at least one application processor chip, each of the at least one application processor chip having at least one application processor interface, and a plurality of peripheral chips, each peripheral chip of the plurality of peripheral chips having a peripheral interface. The peripheral interfaces number more than the at least one processor interface, and the system-on-multiple-modular-chips further includes at least one expansion bridge chip including at least one upstream interface for communicating with the at least one application processor interface, a plurality of downstream interfaces for communicating with the peripheral interfaces of the peripheral chips, and an upstream address decoder on each interface of the least one upstream interface for directing data on the upstream interface to an interface of the plurality of downstream interfaces.

In such a system-on-multiple-modular-chips the expansion bridge chip may further include memory for buffering signals between the at least one upstream interface and the plurality of downstream interfaces.

In such a system-on-multiple-modular-chips, signals from a peripheral module may propagate exclusively to an application processor chip from an interface of the plurality of downstream interfaces to a particular one of the at least one upstream interface. Alternatively, in such a system-on-multiple-modular-chips, signals from at least one interface of the plurality of downstream interfaces may propagate to one of (a) the at least one upstream interface, and (b) another interface of the plurality of downstream interfaces, and the expansion bridge chip may further include a respective downstream address decoder on the at least one downstream interface for directing signals from the at least one downstream interface to one of (a) the at least one upstream interface, and (b) the another interface of the plurality of downstream interfaces.

In such a system-on-multiple-modular-chips, each interface of the at least one upstream interface may have a first bandwidth, each respective interface of the plurality of downstream interfaces may have a respective bandwidth, and the expansion bridge chip may be balanced, such that a sum of all respective bandwidths of the plurality of downstream interfaces is equal to the first bandwidth. In such a variant, of a system-on-multiple-modular-chips, each interface may be divided into lanes, and lanes of the at least one upstream interface may be mapped to lanes of the plurality of downstream interfaces.

Alternatively, in such a system-on-multiple-modular-chips, each interface of the at least one upstream interface may have a first bandwidth, each respective interface of the plurality of downstream interfaces may have a respective bandwidth, and the expansion bridge chip may be unbalanced, such that a sum of all respective bandwidths of the plurality of downstream interfaces exceeds the first bandwidth.

In such a system-on-multiple-modular-chips, the at least one expansion bridge chip may include a plurality of expansion bridge chips. In such a variant of a system-on-multiple-modular-chips, one of the at least one upstream interface of a first one of the expansion bridge chips in the plurality of expansion bridge chips may be connected to one of the at least one application processor interface of one of the at least one application processor, and one of the at least one upstream interface of a second one of the expansion bridge chips in the plurality of expansion bridge chips may be connected to one the plurality of downstream interfaces of the first one of the expansion bridge chips.

In accordance with implementations of the subject matter of the present disclosure, a method of assembling a system-on-multiple-modular-chips for performing a desired function includes choosing desired application processor chips and peripheral chips for performing the desired function, and, for a particular application processor chip:

Examining connections to all peripheral chips to be used with that particular application processor chip to determine if there are sufficient interfaces on the application processor chip to connect the particular application processor chip to all of the peripheral chips to be used with that particular application processor chip, and when there are not sufficient interfaces to connect the particular application processor chip to all of the peripheral chips to be used with that particular application processor chip, selecting at least one expansion bridge chip to provide sufficient interfaces to connect the particular application processor chip to all of the peripheral chips to be used with that particular application processor chip.

Such a method may further include repeating the examining and the selecting for all application processor chips that are chosen in the choosing.

When the expansion bridge chip has at least one upstream interface having a first bandwidth, and a plurality of downstream interfaces each of which has a respective bandwidth, such a method may further include configuring the expansion bridge chip to be balanced, such that a sum of all respective bandwidths of the plurality of downstream interfaces is equal to the first bandwidth.

When the expansion bridge chip has at least one upstream interface having a first bandwidth, and a plurality of downstream interfaces each of which has a respective bandwidth, such a method may further include configuring the expansion bridge chip to be unbalanced, such that a sum of all respective bandwidths of the plurality of downstream interfaces exceeds the first bandwidth.

For a system-on-multiple-modular-chips that was configured according to the method described in the preceding paragraph, a method of operating such a system includes allowing the plurality of downstream interfaces to contend for bandwidth.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
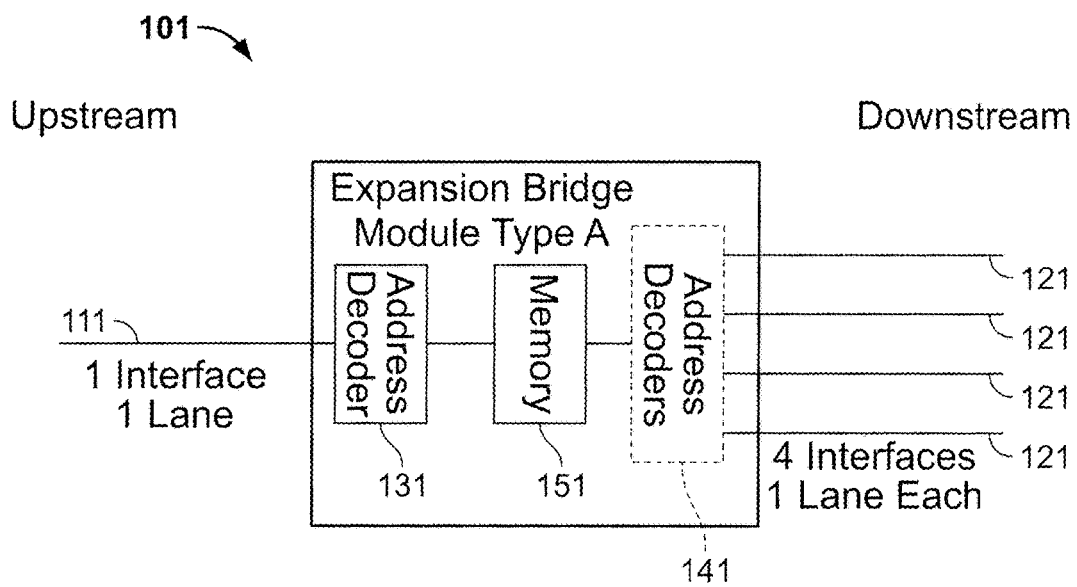
FIG. 1 shows a first example of an expansion bridge module according to an implementation of the subject matter of this disclosure.

As discussed above, in a system-on-multiple-modular-chips, each modular chip may be provided with a certain number of upstream interfaces, and a certain number of downstream interfaces, which may limit how the modules can be interconnected to form a system-on-multiple-modular-chips. Therefore, if a user wants to create a system-on-multiple-modular-chips in a configuration that was not anticipated, it may not be possible. For example, the user may want to connect more peripherals, such as USB and SATA drives, than an application processor can natively support—i.e., the number of peripherals may exceed the number of downstream interfaces on the application processor.

MoChi modules may be higher-level modules that issue requests (and receive replies to those requests) or lower-level modules that receive requests (and issue replies to those requests). For purposes of this disclosure and the claims that follow, higher-level modules, regardless of their function, will be referred to as application processor modules, and lower-level modules, regardless of their function, will be referred to as peripheral modules. In accordance with implementations of the subject matter of this disclosure, a further type of MoChi module or chip, in addition to application processor modules and peripheral modules, is provided. This type of module may be referred to as an expansion bridge module. An expansion bridge module in accordance with implementations of the subject matter of this disclosure has a first number of upstream interfaces and a second number of downstream interfaces.

The first number—i.e., the number of upstream interfaces—will generally be '1', for connection to a downstream interface of an application processor module. However, there may be any number of upstream interfaces (i.e., the "first number" may be a number other than '1'), and an upstream interface of an expansion bridge module could be connected to any downstream interface of any other module in the system, including another expansion bridge module.

Similarly, the second number—i.e., the number of downstream interfaces—will generally be greater than '1'—i.e., '2' or more—for connection to a plurality of peripheral modules. A downstream interface of an expansion bridge module could be connected to any upstream interface of any other module in the system, including another expansion bridge module, and two or more downstream interfaces of an expansion bridge module could be connected to upstream interfaces of a single additional module (assuming that the additional module has more than one upstream interface).

Although generally an "upstream" interface may be thought of as an input interface and a "downstream" interface may be thought of as an output interface, any interface may be bidirectional. For example, an application processor module may issue a data retrieval request, via a downstream interface of the application processor, to an upstream interface of a storage device module. For purposes of that request, the downstream interface of the application processor functions as an output interface, and the upstream interface of the storage device module functions as an input interface. However, when the storage device module returns the requested data to the application processor module, the upstream interface of the storage device module functions as an output interface while the downstream interface of the application processor functions as an input interface.

As discussed above, an expansion bridge module according to implementations of the subject matter of this disclosure can be used to increase the number of downstream modules that a downstream interface of a given module can be connected to. This allows any given module to be connected to more downstream modules than the number of downstream interfaces provided on the given module.

No processing capability is needed on an expansion bridge module according to the subject matter of this disclosure. A simple address decoder on each upstream interface is sufficient. When a system including an expansion bridge module according to the subject matter of this disclosure is configured, each module that can send signals downstream to an expansion bridge module according to the subject matter of this disclosure would be made aware of the presence of the expansion bridge module, and of the downstream modules. An upstream module would include an address in its signal to the expansion bridge module. The address would specify which downstream interface of the expansion bridge module the signal should be routed to in order to reach the desired downstream module.

According to one variant of an implementation of the subject matter of this disclosure, the paths from an upstream interface of an expansion bridge module to as many downstream interfaces of the expansion bridge module as the upstream interface can connect to are bidirectional, but while each downstream interface can send signals upstream to the upstream interface to which it is connected, signals cannot flow from one downstream interface of the expansion bridge module to another. Therefore, in such a variant, no address decoder is needed at a downstream interface of the expansion bridge module. In a second variant, however, signals can flow from any interface—whether an upstream interface or a downstream interface—to any other interface—whether an upstream interface or a downstream interface. Therefore, in such a second variant, all interfaces would include address decoders. However, such a variant would also require sufficient intelligence in downstream modules to include address information in upstream signals.

In addition to any address decoder or decoders that may be provided on one or more interfaces of the expansion bridge module, memory may be included on an expansion bridge module to buffer signals between upstream and downstream interfaces. The buffer memory should be of sufficient size to hold a plurality of signal packets.

Any downstream interface of an expansion bridge module according to implementations of the present disclosure may be connected to another expansion bridge module or to any functional module, including an application processor module or a peripheral module. This ability to chain expansion bridge modules allows essentially unlimited fan-out capability.

Each interface according to the modular chip protocol described above may operate on a link having a maximum specified bandwidth. According to some implementations of the subject matter of this disclosure, each upstream interface of an expansion bridge module would operate at that maximum bandwidth, while each downstream interface connected to that upstream interface would operate at a specified fraction of the maximum bandwidth, such that the sum of the bandwidths of the downstream interfaces would equal the bandwidth of the upstream interface to which the downstream interfaces are connected. Such implementations may be referred to as balanced implementations. According to other implementations of the subject matter of this disclosure, each upstream interface of an expansion bridge module would operate at the maximum bandwidth, while each downstream interface connected to that upstream interface also could operate at the maximum bandwidth. The downstream interfaces in such other implementations would contend for the available bandwidth using, for example, known arbitration techniques. In any implementation, each interface may be divided into lanes, as is known.

Examples of possible configurations of expansion bridge modules according to implementations of the subject matter of this disclosure are shown in FIGS. 1-4. It is within the subject matter of this disclosure to provide any number of upstream interfaces and any number of downstream interfaces, and therefore it is not possible to illustrate all possible combinations. In the example configurations of FIGS. 1-4, each expansion bridge module has only one upstream interface, which may be a common configuration feature. However, an expansion bridge module may be provided with more than one upstream interface, particularly where it is desired to have a fan-in arrangement from multiple application processor modules to a common peripheral module or a common set of peripheral modules.

A first example 101 of an expansion bridge module according to an implementation of the subject matter of this disclosure, which may be referred to as a "Type A" module, is shown in FIG. 1. Expansion bridge module 101 has one upstream interface 111, and four downstream interfaces 121. An address decoder 131 is provided at upstream interface 111 so that incoming signals on upstream interface 111 can be routed to the correct downstream interface 121. In an implementation, as described above, where incoming signals on a downstream interface 121 can be routed to other ones of downstream interfaces 121, optional address decoders 141 are provided, so that incoming signals on a downstream interface 121 can be routed to the correct one of upstream interface 111 and downstream interfaces 121. Memory 151—e.g., random access memory—is provided to buffer signals between the interface on which they are received, and the interface on which they are transmitted.

In this example of a Type A expansion bridge module, there is one upstream interface 111, which may be a one-lane interface of a certain bandwidth. Each of the four downstream interfaces 121 may be a one-lane interface of the same bandwidth as upstream interface 111, in an unbalanced configuration in which any downstream interface 121 can contend with any other downstream interface 121, using known arbitration techniques, for as much of the bandwidth as it can obtain. Alternatively, each of the four downstream interfaces 121 may be a one-lane interface having one quarter of the total bandwidth of upstream interface 111, in a balanced configuration. For example, upstream interface 111 may have one lane with a bandwidth of 8 Gbps, and each of the four downstream interfaces 121 may also have one lane with a bandwidth of 8 Gbps in an unbalanced configuration, or each of the four downstream interfaces 121 may have one lane with a bandwidth of 2 Gbps in a balanced configuration. Such an expansion bridge module may be appropriate for connecting an application processor module to any of many types of low speed peripheral modules.

Figure 2:
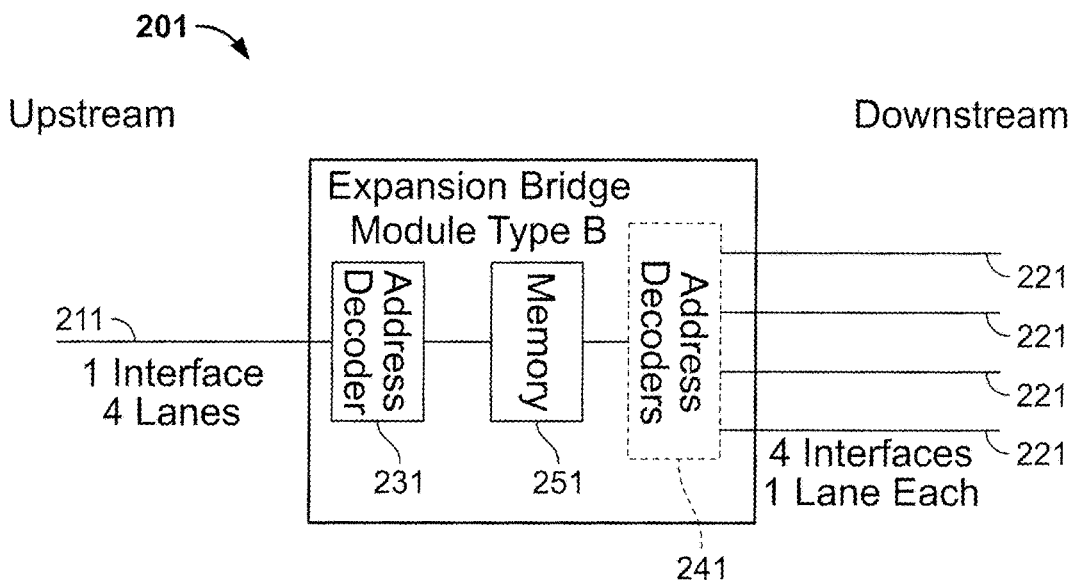
FIG. 2 shows a second example of an expansion bridge module according to an implementation of the subject matter of this disclosure.

A second example 201 of an expansion bridge module according to an implementation of the subject matter of this disclosure, which may be referred to as a "Type B" module, is shown in FIG. 2. Expansion bridge module 201 has one upstream interface 211, and four downstream interfaces 221. An address decoder 231 is provided at upstream interface 211 so that incoming signals on upstream interface 211 can be routed to the correct downstream interface 221. In an implementation, as described above, where incoming signals on a downstream interface 221 can be routed to other ones of downstream interfaces 221, optional address decoders 241 are provided, so that incoming signals on a downstream interface 221 can be routed to the correct one of upstream interface 211 and downstream interfaces 221. Memory 251—e.g., random access memory—is provided to buffer signals between the interface on which they are received, and the interface on which they are transmitted.

In this example of a Type B expansion bridge module, there is one upstream interface 211, which may be a four-lane interface of a certain bandwidth. Each of the four downstream interfaces 221 may be a one-lane interface of that same certain bandwidth, providing a balanced configuration. For example, upstream interface 211 may have four lanes each with a bandwidth of 8 Gbps, and each of the four downstream interfaces 221 may be a one-lane interface having a bandwidth of 8 Gbps. Thus, in both the upstream and downstream directions, there would be four lanes each with a bandwidth of 8 Gbps. This type of expansion bridge module may be useful when there is a mismatch between an upstream application processor module and a downstream peripheral module.

Figure 3:
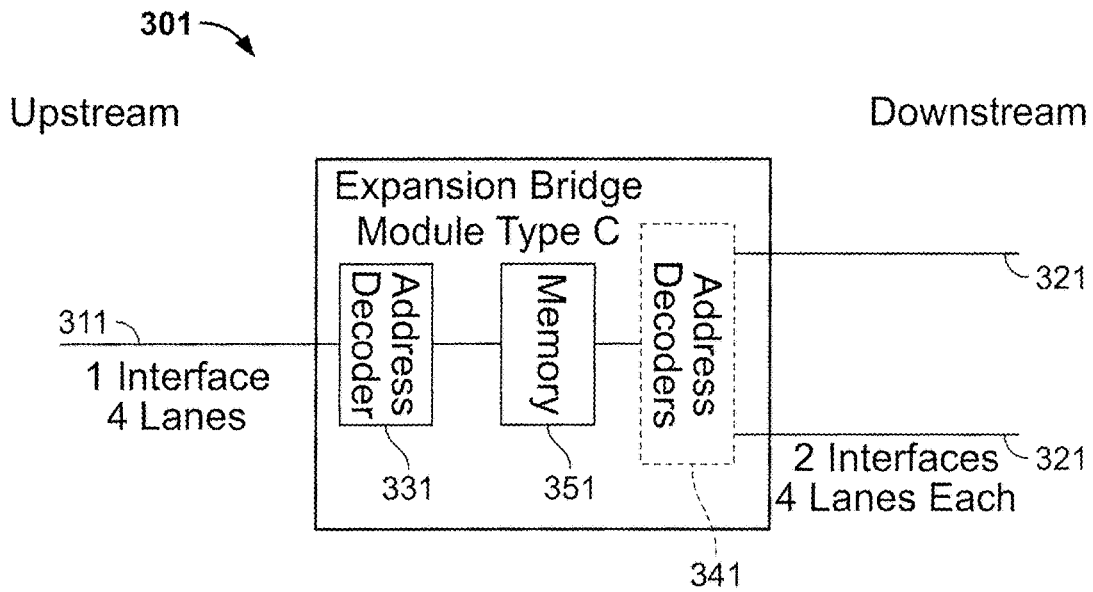
FIG. 3 shows a third example of an expansion bridge module according to an implementation of the subject matter of this disclosure.

A third example 301 of an expansion bridge module according to an implementation of the subject matter of this disclosure, which may be referred to as a "Type C" module, is shown in FIG. 3. Expansion bridge module 301 has one upstream interface 311, and two downstream interfaces 321. An address decoder 331 is provided at upstream interface 311 so that incoming signals on upstream interface 311 can be routed to the correct downstream interface 321. In an implementation, as described above, where incoming signals on a downstream interface 321 can be routed to other ones of downstream interfaces 321, optional address decoders 341 are provided, so that incoming signals on a downstream interface 321 can be routed to the correct one of upstream interface 311 and downstream interfaces 321. Memory 351—e.g., random access memory—is provided to buffer signals between the interface on which they are received, and the interface on which they are transmitted.

In this example of a Type C expansion bridge module, there is one upstream interface 311, which may be a four-lane interface of a certain bandwidth. Each of the two downstream interfaces 321 may be a four-lane interface of half of that certain bandwidth, providing a balanced configuration. For example, upstream interface 311 may have four lanes, with each lane having a bandwidth of 8 Gbps, and each of the two downstream interfaces 321 may be a four-lane interface, with each lane having a bandwidth of 4 Gbps. Thus, in the upstream direction, there would be four lanes, each with a bandwidth of 8 Gbps, while in the downstream direction, there would be eight lanes, each with a bandwidth of 4 Gbps, providing a balanced configuration. Alternatively, each of the two downstream interfaces 321 may be a four-lane interface of the same bandwidth as upstream interface 311, in an unbalanced configuration in which any downstream interface 321 can contend with any other downstream interface 321, using known arbitration techniques, for as much of the bandwidth as it can obtain. For example, upstream interface 311 may have four lanes, with each lane having a bandwidth of 8 Gbps, and each of the two downstream interfaces 321 may be a four-lane interface, with each lane having a bandwidth of 8 Gbps. This type of expansion bridge module may be useful for general fan-out-type expansion.

Figure 4:
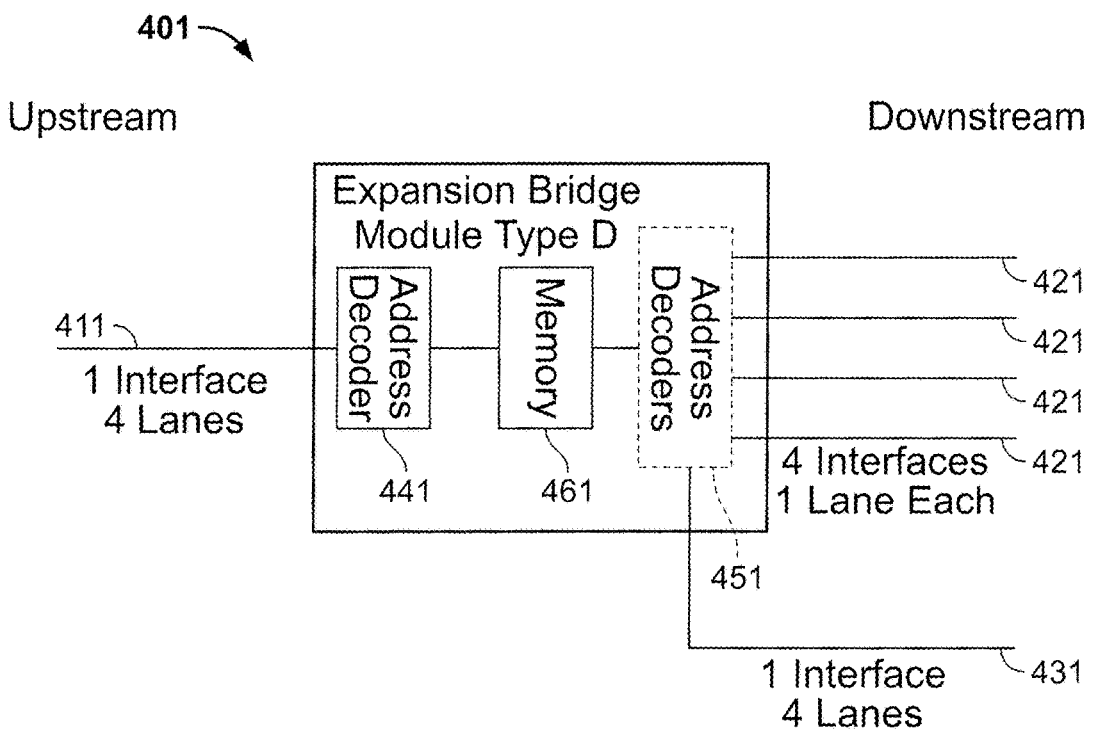
FIG. 4 shows a fourth example of an expansion bridge module according to an implementation of the subject matter of this disclosure.

A fourth example 401 of an expansion bridge module according to an implementation of the subject matter of this disclosure, which may be referred to as a "Type D" module, is shown in FIG. 4. Expansion bridge module 401 has one upstream interface 411, four downstream interfaces 421, and one downstream interface 431. An address decoder 441 is provided at upstream interface 411 so that incoming signals on upstream interface 411 can be routed to the correct downstream interface 421, 431. In an implementation, as described above, where incoming signals on a downstream interface 421 or 431 can be routed to other ones of downstream interfaces 421, 431, optional address decoders 451 are provided, so that incoming signals on a downstream interface 421, 431 can be routed to the correct one of upstream interface 411 and downstream interfaces 421, 431. Memory 461—e.g., random access memory—is provided to buffer signals between the interface on which they are received, and the interface on which they are transmitted.

In this example of a Type D expansion bridge module, there is one upstream interface 411, which may be a four-lane interface, with each lane having a certain bandwidth. Each of the four downstream interfaces 421 may be a one-lane interface of that same certain bandwidth, while downstream interface 431 may be a four-lane interface, with each lane having that same certain bandwidth, providing an unbalanced configuration. For example, upstream interface 411 may have four lanes, with each lane having a bandwidth of 8 Gbps. Each of the four downstream interfaces 421 may be a one-lane interface, with each lane having a bandwidth of 8 Gbps, while downstream interface 431 may be a four-lane interface, with each lane having a bandwidth of 8 Gbps. Thus, in the upstream direction, there would be four lanes, each with a bandwidth of 8 Gbps, while in the downstream direction, there would be eight lanes, each with a bandwidth of 8 Gbps, providing an unbalanced configuration in which any downstream interface 421, 431 can contend with any other downstream interface 421, 431, using known arbitration techniques, for as much of the bandwidth as it can obtain. This type of expansion bridge module may be useful for non-blocking fan-out-type expansion (i.e., no downstream interface is blocked from taking as much bandwidth as it needs, subject to arbitration with the other downstream interfaces).

These four types of expansion bridge modules A (101), B (201), C (301) and D (401) are just four out of an essentially unlimited number of possible expansion bridge modules. There can be any number of downstream interfaces, any number of lanes within a downstream interface, and any bandwidth in a lane. If the number of downstream interfaces or lanes becomes great enough, amplification may be added as is well known. Generally, the number of upstream interfaces usually would not be more than one, because if an application processor module has more than one downstream interface, a one-input expansion bridge module could be provided at each downstream interface of that application processor module. However, an expansion bridge module with more than one upstream interface cannot be ruled out. For example, expansion bridge module with more than one upstream interface can be used to provide fan-in to allow multiple application processor modules to share certain peripherals. In any case, it is not possible to illustrate each possible expansion bridge module, because the number of possible application processor modules is not limited.

Figure 5:
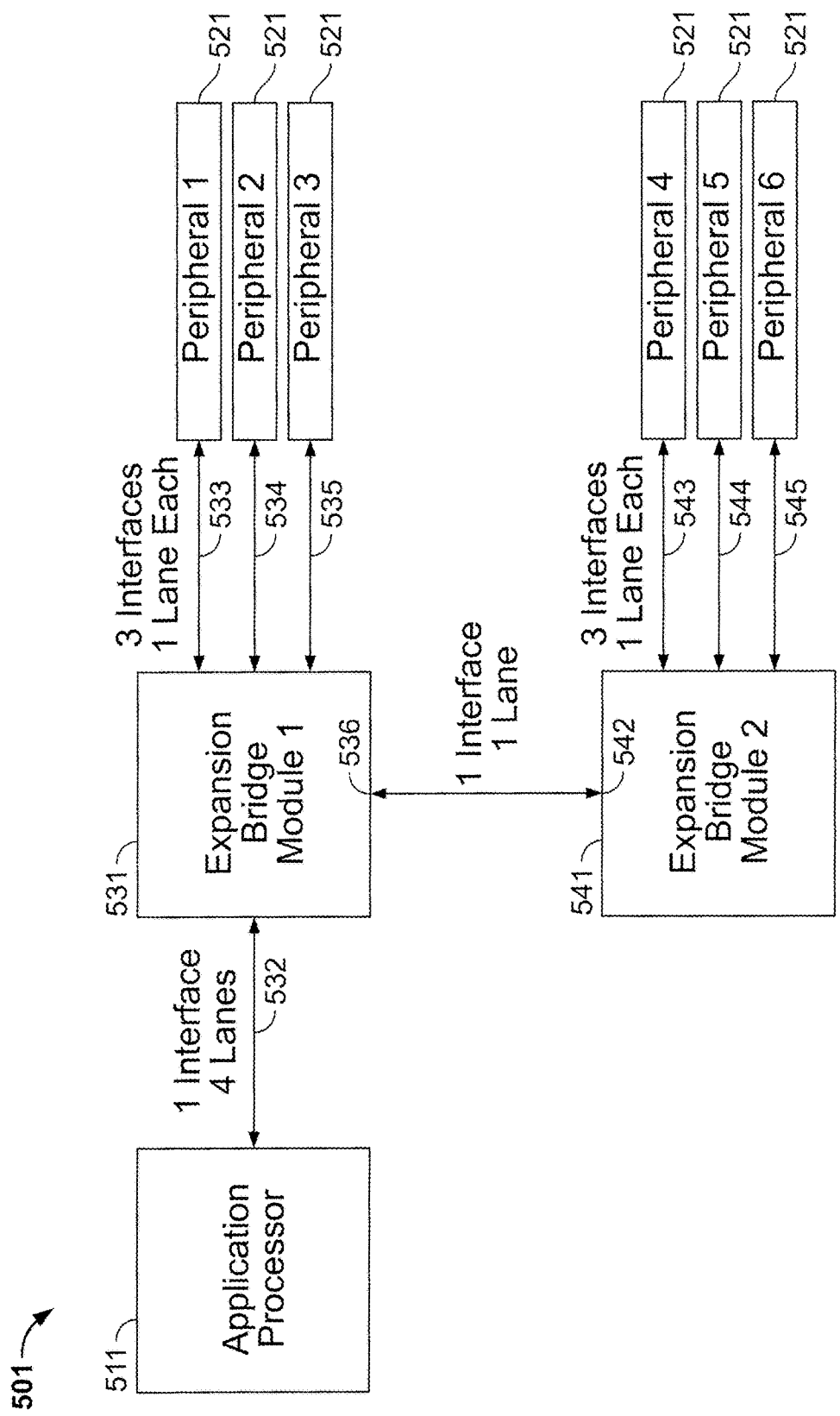
FIG. 5 shows an example of a system-on-multiple-modular-chips assembled according to an implementation of the subject matter of this disclosure.

Similarly, any number of systems-on-multiple-modular-chips may be constructed using application processor modules, peripheral modules, and expansion bridge modules according to implementations of the subject matter of this disclosure. A relatively simple example 501 of such a system is illustrated in FIG. 5. System 501 includes one application processor module 511 connected to six peripheral modules 521. Although application processor module 511 could have been designed with six peripherals in mind, in this example it was designed with only one downstream interface. Therefore, two expansion bridge modules 531, 541, are used to connect application processor module 511 to the six peripheral modules.

Expansion bridge module 531 has one four-lane upstream interface 532 and four one-lane downstream interfaces 533-536, and thus may be similar to Type B expansion bridge module 201. Expansion bridge module 541 has one one-lane upstream interface 542 (connected to downstream interface 536 of expansion bridge module 531), and three one-lane downstream interfaces 543-545. Expansion bridge module 541 is thus a fifth type of expansion bridge module, in addition to the four types of expansion bridge modules 101, 201, 301, 401 described above in connection with FIGS. 1-4. And as in the case of the number of possible different types of expansion bridge modules, the number of possible different types of systems incorporating expansion bridge modules according to implementations of the subject matter of this disclosure is not limited. Therefore, it is not possible to draw every possible system.

Figure 6:
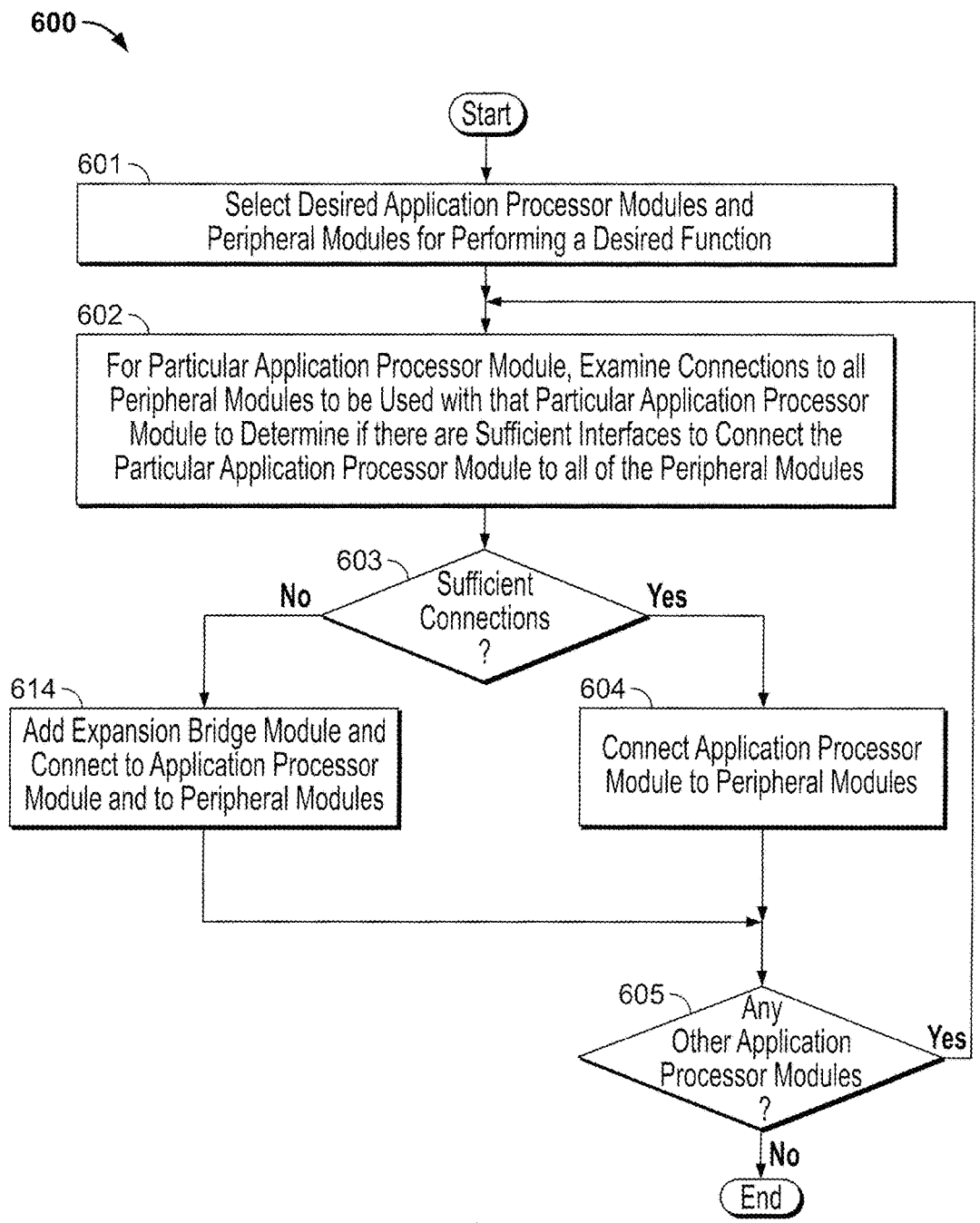
FIG. 6 is a flow diagram of a method for assembling a system-on-multiple-modular-chips according to an implementation of the subject matter of this disclosure.

A method 600 according to implementations of the subject matter of this disclosure for assembling a system-in-multiple-modular-chips is diagrammed in FIG. 6. At 601 desired application processor modules and peripheral modules for performing a desired function are selected. At 602, for a particular application processor module, connections to all peripheral modules to be used with that particular application processor module are examined to determine if there are sufficient interfaces to connect the particular application processor module to all of the peripheral modules. If at 603 there are sufficient interfaces to connect the particular application processor module to all of the peripheral modules, then at 604 that application processor module is connected to those peripheral modules, and at 605 it is determined whether there are any other application processor modules to be connected to peripheral modules. If at 605, there are no other application processor modules to be connected to peripheral modules, and method 600 ends. If, at 605, there is at least one other application processor module to be connected to peripheral modules, then flow returns to 602 for the next application processor module.

If at 603 there are not sufficient interfaces to connect the particular application processor module to all of the peripheral modules to which connections are required, then at 614 an appropriate expansion bridge module is selected and added to the system to provide sufficient interfaces to connect the particular application processor module to all of those peripheral modules, and flow continues to 605.

Thus it seen that apparatus and methods allowing a user to create a system-on-multiple-modular-chips using modular chips in a configuration that was not anticipated, has been provided.

As used herein, the construction "one of A and B" shall have the meaning "A or B."

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. An expansion bridge chip for a modular chip system, the expansion bridge chip comprising:
at least one upstream interface for communicating with an application processor chip, each interface among the at least one upstream interface having a first bandwidth;
a plurality of downstream interfaces, for communicating with peripheral chips, each respective interface among the plurality of downstream interfaces having a respective downstream bandwidth; and
an upstream address decoder on each interface among the least one upstream interface for directing data on the upstream interface to an interface among the plurality of downstream interfaces; wherein:
the expansion bridge chip is balanced, such that a sum of all respective downstream bandwidths of the plurality of downstream interfaces is equal to the first bandwidth.

2. The expansion bridge chip of claim 1 further comprising memory for buffering signals between the at least one upstream interface and the plurality of downstream interfaces.

3. The expansion bridge chip of claim 1 wherein signals from a peripheral chip propagate exclusively to an application processor chip from an interface among the plurality of downstream interfaces to a particular one of the at least one upstream interface.

4. The expansion bridge chip of claim 1 wherein:
signals from at least one interface among the plurality of downstream interfaces propagate to one of (a) the at least one upstream interface, and (b) another interface among the plurality of downstream interfaces; the expansion bridge chip further comprising:
a respective downstream address decoder on the at least one downstream interface for directing signals from the at least one downstream interface to one of (a) the at least one upstream interface, and (b) the another interface among the plurality of downstream interfaces.

5. An expansion bridge chip for a modular chip system, the expansion bridge chip comprising:
at least one upstream interface for communicating with an application processor chip, each interface among the at least one upstream interface having a first bandwidth;

a plurality of downstream interfaces, for communicating with peripheral chips, each respective interface among the plurality of downstream interfaces having a respective downstream bandwidth; and an upstream address decoder on each interface among the at least one upstream interface for directing data on the upstream interface to an interface among the plurality of downstream interfaces; wherein:

the expansion bridge chip is unbalanced, such that a sum of all respective downstream bandwidths of the plurality of downstream interfaces exceeds the first bandwidth.

6. The expansion bridge chip of claim 5 wherein signals from a peripheral chip propagate exclusively to an application processor chip from an interface among the plurality of downstream interfaces to a particular one of the at least one upstream interface.

7. The expansion bridge chip of claim 5 wherein:

signals from at least one interface among the plurality of downstream interfaces propagate to one of (a) the at least one upstream interface, and (b) another interface among the plurality of downstream interfaces; the expansion bridge chip further comprising:

a respective downstream address decoder on the at least one downstream interface for directing signals from the at least one downstream interface to one of (a) the at least one upstream interface, and (b) the another interface among the plurality of downstream interfaces.

8. A system-on-multiple-modular-chips, the system-on-multiple-modular-chips comprising:

at least one application processor chip, each of the at least one application processor chip having at least one application processor interface; and a plurality of peripheral chips, each peripheral chip among the plurality of peripheral chips having a peripheral interface; wherein:

the peripheral interfaces number more than the at least one processor interface; the system-on-multiple-modular-chips further comprising:

at least one expansion bridge chip including:

at least one upstream interface for communicating with the at least one application processor interface, each interface among the at least one upstream interface having a first bandwidth, a plurality of downstream interfaces for communicating with the peripheral interfaces of the peripheral chips, each respective interface among the plurality of downstream interfaces having a respective downstream bandwidth, and an upstream address decoder on each interface of the least one upstream interface for directing data on the upstream interface to an interface among the plurality of downstream interfaces; wherein:

the expansion bridge chip is balanced, such that a sum of all respective downstream bandwidths of the plurality of downstream interfaces is equal to the first bandwidth.

9. The system-on-multiple-modular-chips of claim 8 wherein the expansion bridge chip further comprises memory for buffering signals between the at least one upstream interface and the plurality of downstream interfaces.

10. The system-on-multiple-modular-chips of claim 8 wherein signals from a peripheral chip propagate exclusively to an application processor chip from an interface among the plurality of downstream interfaces to a particular one of the at least one upstream interface.

11. The system-on-multiple-modular-chips of claim 8 wherein:

signals from at least one interface among the plurality of downstream interfaces propagate to one of (a) the at least one upstream interface, and (b) another interface among the plurality of downstream interfaces; the expansion bridge chip further comprising:

a respective downstream address decoder on the at least one downstream interface for directing signals from the at least one downstream interface to one of (a) the at least one upstream interface, and (b) the another interface among the plurality of downstream interfaces.

12. The system-on-multiple-modular-chips of claim 8 wherein each interface is divided into lanes, and lanes of the at least one upstream interface are mapped to lanes of the plurality of downstream interfaces.

13. The system-on-multiple-modular-chips of claim 8 wherein the at least one expansion bridge chip comprises a plurality of expansion bridge chips.

14. The system-on-multiple-modular-chips of claim 13 wherein:

one of the at least one upstream interface of a first one of the expansion bridge chips in the plurality of expansion bridge chips is connected to one of the at least one application processor interface of one of the at least one application processor chip; and one of the at least one upstream interface of a second one of the expansion bridge chips in the plurality of expansion bridge chips is connected to one of the plurality of downstream interfaces of the first one of the expansion bridge chips.

15. A system-on-multiple-modular-chips, the system-on-multiple-modular-chips comprising:

at least one application processor chip, each of the at least one application processor chip having at least one application processor interface; and a plurality of peripheral chips, each peripheral chip among the plurality of peripheral chips having a peripheral interface; wherein:

the peripheral interfaces number more than the at least one processor interface; and the system-on-multiple-modular-chips further comprises:

at least one expansion bridge chip including:

at least one upstream interface for communicating with the at least one application processor interface, each interface among the at least one upstream interface having a first bandwidth, a plurality of downstream interfaces for communicating with the peripheral interfaces of the peripheral chips, each respective interface among the plurality of downstream interfaces having a respective downstream bandwidth, and an upstream address decoder on each interface of the least one upstream interface for directing data on the upstream interface to an interface among the plurality of downstream interfaces; wherein:

the expansion bridge chip is unbalanced, such that a sum of all respective downstream bandwidths of the plurality of downstream interfaces exceeds the first bandwidth.

16. The system-on-multiple-modular-chips of claim 15 wherein signals from a peripheral chip propagate exclusively to an application processor chip from an interface among the plurality of downstream interfaces to a particular one of the at least one upstream interface.

17. The system-on-multiple-modular-chips of claim 15 wherein:

signals from at least one interface among the plurality of downstream interfaces propagate to one of (a) the at least one upstream interface, and (b) another interface among the plurality of downstream interfaces; the expansion bridge chip further comprising:
a respective downstream address decoder on the at least one downstream interface for directing signals from the at least one downstream interface to one of (a) the at least one upstream interface, and (b) the another interface among the plurality of downstream interfaces.

18. The system-on-multiple-modular-chips of claim 15 wherein the at least one expansion bridge chip comprises a plurality of expansion bridge chips.

19. The system-on-multiple-modular-chips of claim 18 wherein:
one of the at least one upstream interface of a first one of the expansion bridge chips in the plurality of expansion bridge chips is connected to one of the at least one application processor interface of one of the at least one application processor chip; and
one of the at least one upstream interface of a second one of the expansion bridge chips in the plurality of expansion bridge chips is connected to one of the plurality of downstream interfaces of the first one of the expansion bridge chips.

20. A method of assembling a system-on-multiple-modular-chips for performing a desired function, the method comprising:
choosing desired application processor chips and peripheral chips for performing the desired function;
for a particular application processor chip:
examining connections to all peripheral chips to be used with that particular application processor chip to determine if there are sufficient interfaces on the application processor chip to connect the particular application processor chip to all of the peripheral chips to be used with that particular application processor chip, and
when there are not sufficient interfaces to connect the particular application processor chip to all of the peripheral chips to be used with that particular application processor chip, selecting at least one expansion bridge chip, having at least one upstream interface for communicating with an application processor chip, each interface among the at least one upstream interface having a first bandwidth, and a plurality of downstream interfaces for communicating with peripheral chips, each respective one of the plurality of downstream interfaces having a respective downstream bandwidth, to provide sufficient interfaces to connect the particular application processor chip to all of the peripheral chips to be used with that particular application processor chip; and
configuring the expansion bridge chip to be balanced, such that a sum of all respective downstream bandwidths of the plurality of downstream interfaces is equal to the first bandwidth.

21. The method of claim 20 further comprising repeating the examining and the selecting for all application processor chips that are chosen in the choosing.

22. A method of assembling a system-on-multiple-modular-chips for performing a desired function, the method comprising:
choosing desired application processor chips and peripheral chips for performing the desired function;
for a particular application processor chip:
examining connections to all peripheral chips to be used with that particular application processor chip to determine if there are sufficient interfaces on the application processor chip to connect the particular application processor chip to all of the peripheral chips to be used with that particular application processor chip, and
when there are not sufficient interfaces to connect the particular application processor chip to all of the peripheral chips to be used with that particular application processor chip, selecting at least one expansion bridge chip, having at least one upstream interface for communicating with an application processor chip and having a first bandwidth, and a plurality of downstream interfaces for communicating with peripheral chips, each respective interface among the plurality of downstream interfaces having a respective downstream bandwidth; and
configuring the expansion bridge chip to be unbalanced, such that a sum of all respective downstream bandwidths of the plurality of downstream interfaces exceeds the first bandwidth.

23. A method of operating a system-on-multiple-modular-chips that was configured according to the method of claim 22, the method of operating comprising allowing the plurality of downstream interfaces to contend for bandwidth.

24. The method of claim 22 further comprising repeating the examining and the selecting for all application processor chips that are chosen in the choosing.

\* \* \* \* \*